United States Patent [19]

Duerr et al.

[11] Patent Number: 4,465,454

[45] Date of Patent: Aug. 14, 1984

[54] EXTRUSION DIE

[75] Inventors: Francis R. Duerr; Leonard W. Pokallus, both of Louisville, Ky.

[73] Assignee: Corning Glass Works, Corning, N.Y.

[21] Appl. No.: 480,017

[22] Filed: Mar. 29, 1983

[51] Int. Cl.³ .............................................. B29F 3/04
[52] U.S. Cl. ............................. 425/461; 264/177 R; 264/209.1; 264/209.8; 425/462; 425/463; 425/464
[58] Field of Search ............................. 425/461–467, 425/197–199; 264/177 R, 209.1, 209.8

[56] References Cited

U.S. PATENT DOCUMENTS

| | | |
|---|---|---|
| 2,908,037 | 10/1959 | Harkenrider . |
| 3,038,202 | 6/1962 | Harkenrider ..................... 425/464 |
| 3,406,230 | 10/1968 | Baxter et al. . |
| 3,790,654 | 2/1974 | Bagley ............................ 264/209.1 |
| 3,846,197 | 8/1972 | Wiley . |
| 4,118,456 | 10/1978 | Blanding et al. ............... 264/177 R |
| 4,178,145 | 12/1979 | Hamamoto et al. ............... 425/199 |
| 4,243,370 | 1/1981 | Higuchi et al. .................... 425/462 |
| 4,259,057 | 3/1981 | Abe et al. ............................ 425/463 |
| 4,290,743 | 9/1981 | Suzuki ............................. 264/177 R |
| 4,333,896 | 6/1982 | Cunningham ................... 264/177 R |
| 4,349,329 | 9/1982 | Naito et al. ...................... 264/177 R |
| 4,354,820 | 10/1982 | Yamamoto et al. ................ 425/197 |
| 4,373,895 | 2/1983 | Yamamoto et al. ................ 425/197 |

FOREIGN PATENT DOCUMENTS 857808  1/1961  United Kingdom ............ 425/382 R

Primary Examiner—Jeffery R. Thurlow
Attorney, Agent, or Firm—B. R. Turner

[57] ABSTRACT

In an extrusion die, restricted flow of material from large to small feed holes is relieved by the formation of a transition zone within the die. The transition zone is formed by extending either or both of the large and small feed holes so that they axially overlap.

16 Claims, 12 Drawing Figures

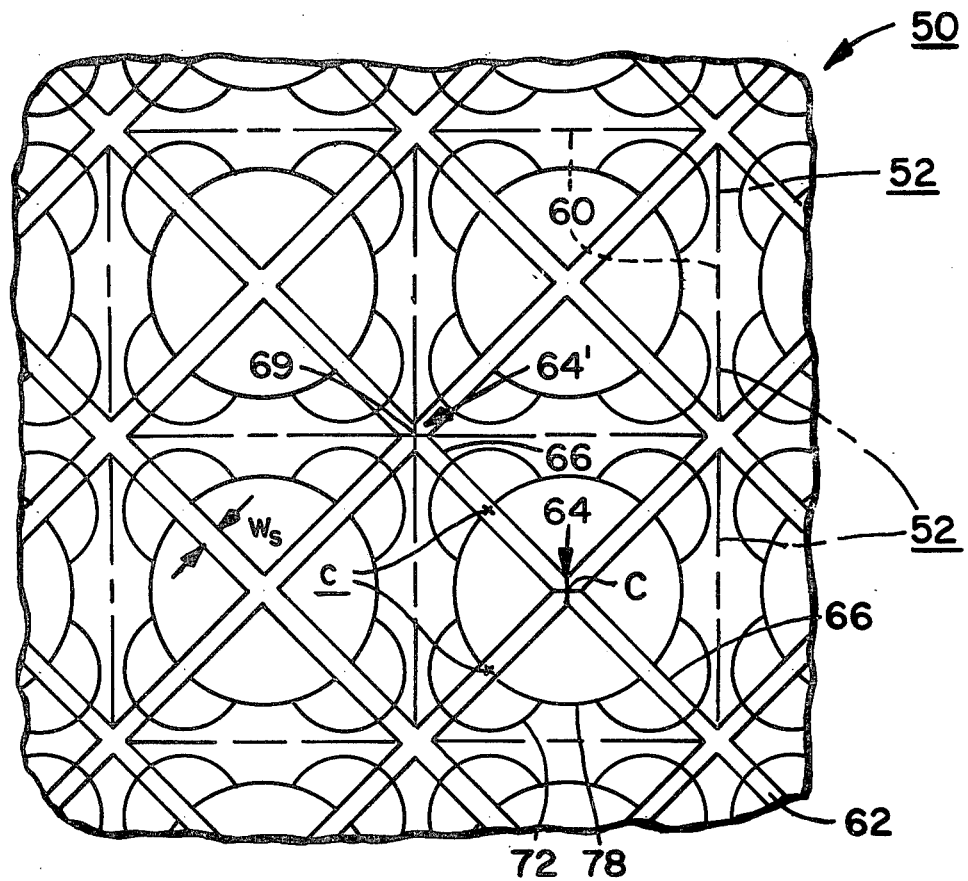
Fig. 8
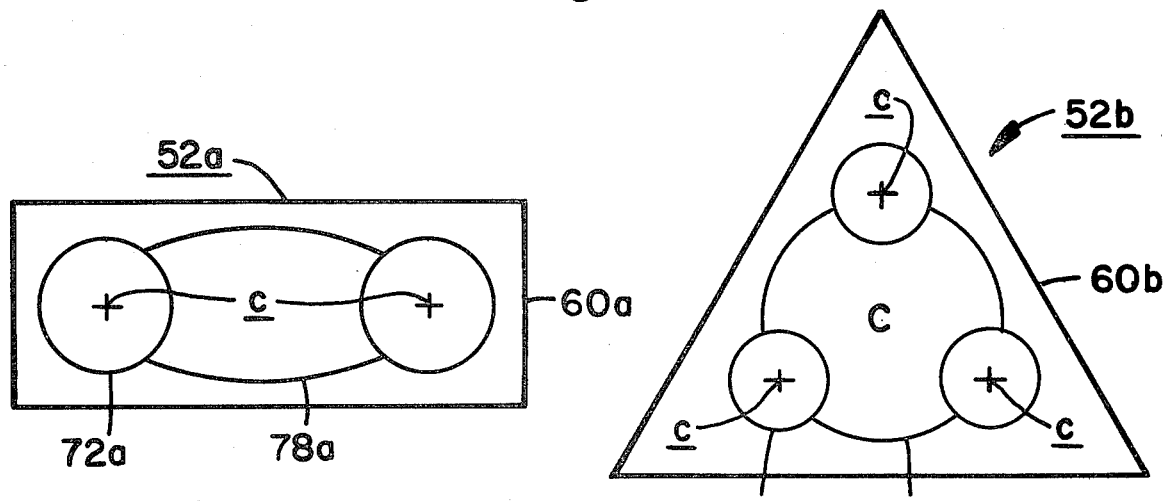
Fig. 9
Fig. 10

EXTRUSION DIE

BACKGROUND OF THE INVENTION

The invention is an improved extrusion die for forming honeycomb structures. Ceramic material is progressively fed through the die via large feed holes, small feed holes and intersecting slots.

FIGS. 1a and 1b herein are respective side section and top views of a prior art die disclosed in U.S. Pat. No. 4,118,456. The Prior Art die 10 is a laminate formed of a feed body member 12 brazed to an outlet body member 14. A planar parting surface P is formed between opposed faces 34 and 38 of the respective members.

The feed body member 12 has relatively large feed passageways 32 feeding a plurality of relatively small feed holes 22 in the outlet body member 14. A plurality of intersecting slots 16, formed in the outlet body member 14, communicate with, and are fed by, the small feed holes 22. Alternate intersections 18 of the slots 16 are located on center with the small feed holes 22, and are fed thereby. Extrusion material (not shown) is fed from the large feed holes 32 through the small holes 22 and the slots 16 to form a known honeycomb structure.

It can be appreciated from FIG. 1b that each large feed hole 32 feeds a plurality or set of small feed holes 22. However, each large feed hole 32 is not large enough to fully expose, or inscribe within its circumference, the set of small feed holes 22. Thus, a portion 26 of each small feed hole 22 is masked by material forming the inlet body member 12. An unmasked portion 27 of each small feed hole 22 forms a narrow gap G for the passage of extrusion material from the large feed hole 32. Because the gaps G are small, the die is very sensitive to variations in the size of the individual gaps G. Thus, any variation in the size of the gaps G results in major differences in the flow of extrusion material through the individual small feed holes 22 fed thereby. Consequently the honeycomb structure may extrude unevenly.

As the extrusion material passes through each gap G, the flow of said material is restricted. The restriction, or gap G, causes acceleration and compaction of the extrusion material as it moves within the die 10. This causes a relatively high pressure drop across the die 10. Because the pressure drops, more force must be applied to move the extrusion material through the die 10. Extreme forces cause premature die failures. The die 10 also wears severely near sharp corners 28 formed at the interface between the feed body member 12 and the outlet body member 14.

In summary, the flow of material in the prior art device is restricted, causing reduced die life, poor quality ware, and uneven die wear.

The present invention removes the restriction by forming a transition zone in the die. The principle may be extended to dies having more than two body members.

In the present invention, a transition zone is preferably formed by extending either or both the large and small feed holes so that they axially overlap. Extension of the large and small feed holes removes only that material which does not form part of the brazed parting surface. Thus, the laminated strength of the die is substantially unaffected.

DESCRIPTION OF THE DRAWINGS

FIG. 1b is a fragmented top view of the prior art die illustrated in FIG. 1a.

FIG. 8 is a schematic representation of an array of cells in two dimensions. The solid lines illustrate the interrelationship of the elements, and the broken lines represent the boundaries of adjacent cells. The representation of the elements is without regard for drafting conventions relative to hidden lines.

FIGS. 9 and 10 show schematic plan views of alternate embodiments of hole layouts and cell shapes of the present invention.

SUMMARY OF THE INVENTION

Figure 1A:
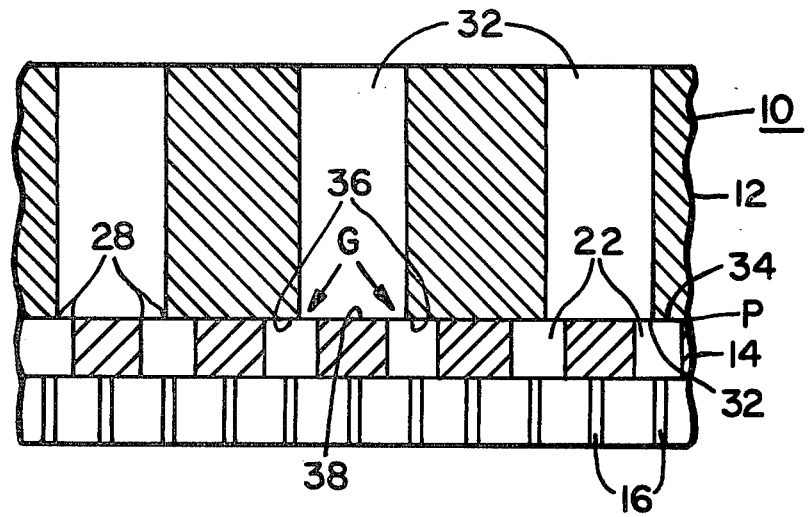
FIG. 1a is a side sectional elevation of a die of the prior art.

There has been provided an extrusion die for forming honeycomb structures. The die includes a body member having axially spaced apart parallel inlet and outlet faces. A plurality of interconnected discharge slots are axially formed in the body member. The discharge slots have outlet ends and root ends. The outlet ends communicate with an outlet face of the body member, and the root ends are located within the body member. A plurality of relatively small feed holes are axially formed in sets within the body member. Each small feed hole communicates in axially overlapping relation with selected portions of the interconnected discharge slots. A plurality of relatively large feed holes are axially formed in the body member. Each large feed hole has an inlet and an outlet end. The inlet end is located in communication with the inlet face of the body member, and the outlet end is located within the body member. Each large feed hole communicates with, and is in axially overlapping relation with, each of the small feed holes in a selected corresponding set. The overlap of the small and large feed holes forms a transition zone of enlarged interior passageways within the die. The transition zone thereby smooths the way for extrusion of material through the die, and desensitizes the die to the effects of size variations of die components.

DESCRIPTION OF THE PREFERRED EMBODIMENT

Referring to FIGS. 2-8, the present invention is directed to an improved extrusion die 50 for forming thin honeycomb structures (not shown). The die 50 is preferably formed as a laminate of at least two opposed metal plates 61 and 63, sometimes hereinafter referred to as body plate 61 and face plate 63. In a preferred embodiment the plates 61 and 63 are joined together by brazing respective opposed faces 65 and 67. The brazed interface between the body plate 61 and face plate 63 is referred to herein as parting surface P'. The die 50 has a series of holes and slots in axial communication. The holes and slots form through passageways 53, for extrusion material (not shown). The passageways 53 extend from an inlet face 54 to an outlet face 56 of the die 50. Selected holes and slots are arranged so that they axially overlap. At least one transition zone, or enlargement of the interior passageways, is thereby formed to allow for a smooth flow of the extrusion material through the die 50.

Figure 2:
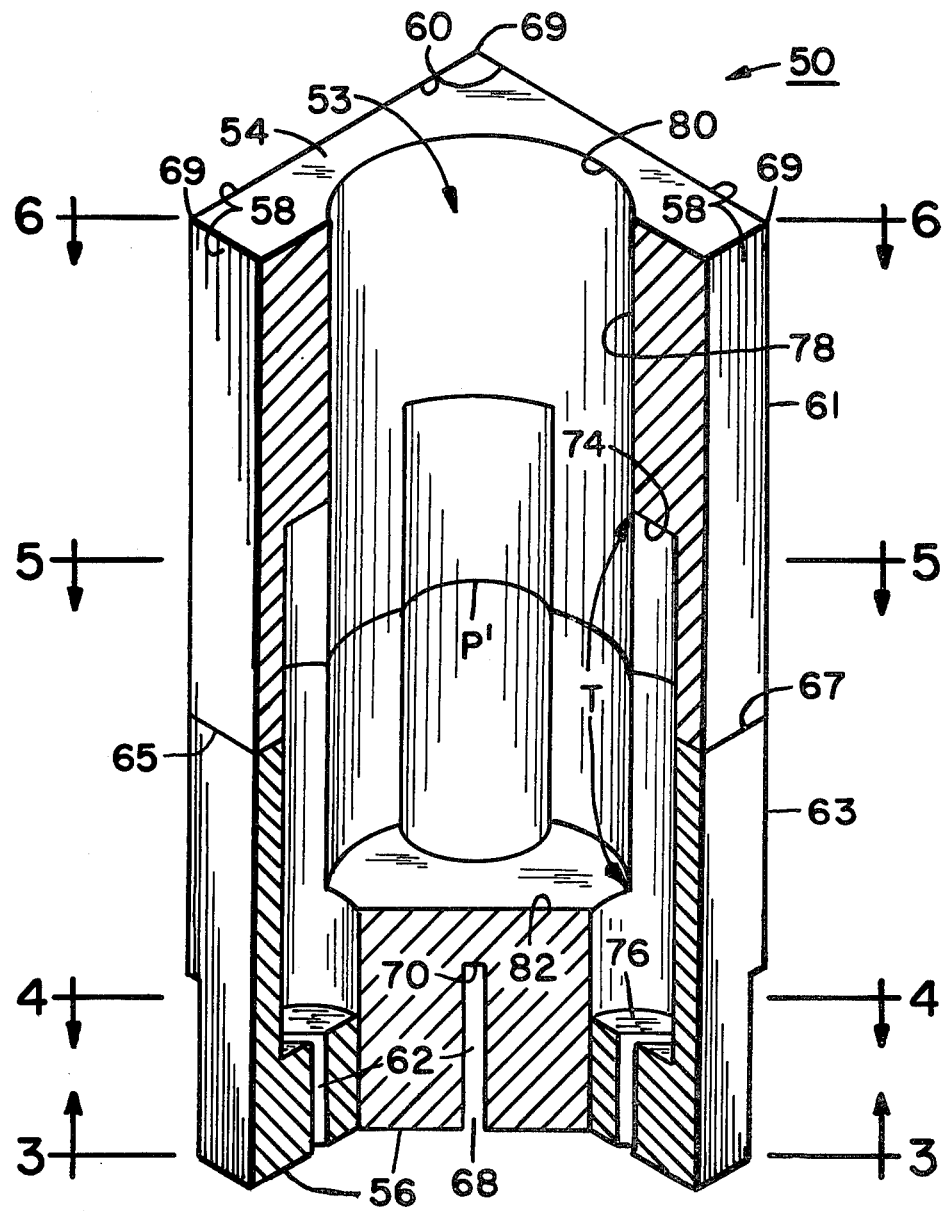
FIG. 2 is a cut away perspective view of a cell of the die of the present invention, illustrating the internal structure thereof.

FIG. 2 shows a cut away perspective of a cell 52 of the extrusion die 50. For convenience, the cell 52 may be characterized as a geometrically defined, integral portion of the brazed together body plate 61 and face plate 63. The cell 52 may also be characterized as a three dimensional figure enclosing a specific portion of the die 50. The cell 52 is chosen as the basic unit or building block of the die 50. A uniform, symmetrical and repeatable pattern of holes and slots (hereinafter described) make up the through passageways 53. Cells 52 may be arranged to form any manner of various dies for extruding various shaped honeycomb structures. For examples, a plurality of cells 52 may be arranged as integral parts of the die 50 in any known transverse profile such as a square, rectangle, circle or elipse.

Each cell 52 may be geometrically defined as a figure axially bound by respective inlet and outlet faces 54 and 56, and laterally bound by four orthogonal faces 58. Lateral margins 60 of the cell 52 are defined by the intersection of the orthogonal faces 58 and the respective inlet and outlet faces 54 and 56. In the preferred embodiment, the lateral margins 60 form a square having corners 69.

Each cell 52 has a pair of slots 62 axially formed therein. The slots 62 extend diagonally across the outlet face 56 and intersect at 64, a geometric center C of the cell 52 (see FIGS. 3 and 4). Each slot 62 has an outlet end 68 and a root end 70. The outlet end 68 lies in the outlet face 56 of the cell 52, and the root end 70 is located interiorly thereof. Each slot 62 is relatively narrow for forming thin walled honeycomb structures. Each slot 62 in a cell 52 has web forming portions, or webs, 66 extending radially from the intersection 64.

The cell 52 has a set of four small feed holes 72 axially formed therein. The small feed holes 72 are symetrically located about the center C of the cell 52, and each is in communication with a corresponding one of the webs 66. In a preferred embodiment, each small feed hole 72 has its respective center c located in the web 66, half way between the center C of the cell 52 and the corner 69.

The small feed holes 72 extend within the cell 52 from an inlet end 74 to an outlet end 76. Each small feed hole 72 axially overlaps and communicates with a slot 62, so that its outlet end 76 lies axially downstream of the root end 70 of the slot 62 (see FIG. 7).

The cell 52 has a large feed hole 78 axially formed therein. The large feed hole 78 has an inlet end 80, and an outlet end 82. The inlet end 80 is located in the inlet face 54 of the die 50, and the outlet end 82 is located interiorly thereof. The large feed hole 78 has a radius R which inscribes up to at least the centers c of each of the small feed holes 72 (see FIGS. 5 and 6).

The large feed hole 78 and the small feed holes 72 overlap to form a transition zone T. The transition zone T allows the extrusion material to move laterally in the cell 52 as it moves from the large feed hole 78 into each small feed hole 72.

Figure 1B:
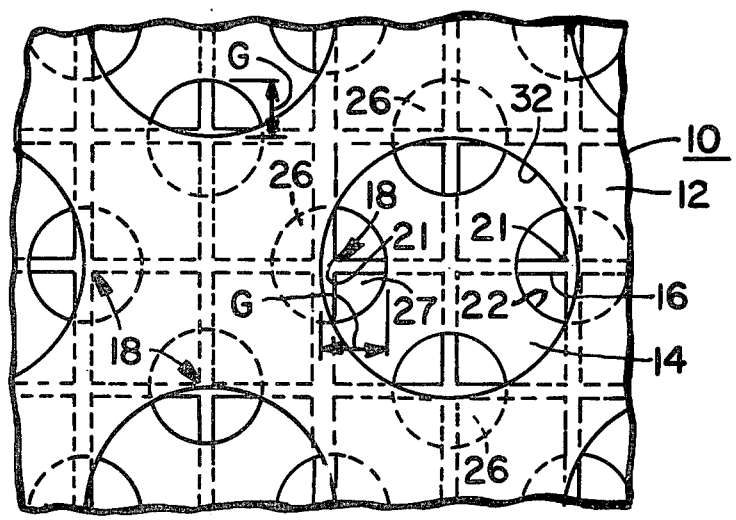

Referring to the prior art device in FIGS. 1a and 1b, as extrusion material moves from the large feed hole 32 to each of the small feed holes 22, the material must pass through narrow gaps G. As previously stated, variation in the relative sizes of the restrictions G causes flow irregularities within the die 10. In the present invention, the function of the transition zone T is to open up the interior of the die 50, making it relatively insensitive to the variations in the sizing of the die components. The result is a smoother and more even distribution of extrusion material to the slots 62.

Figure 7:
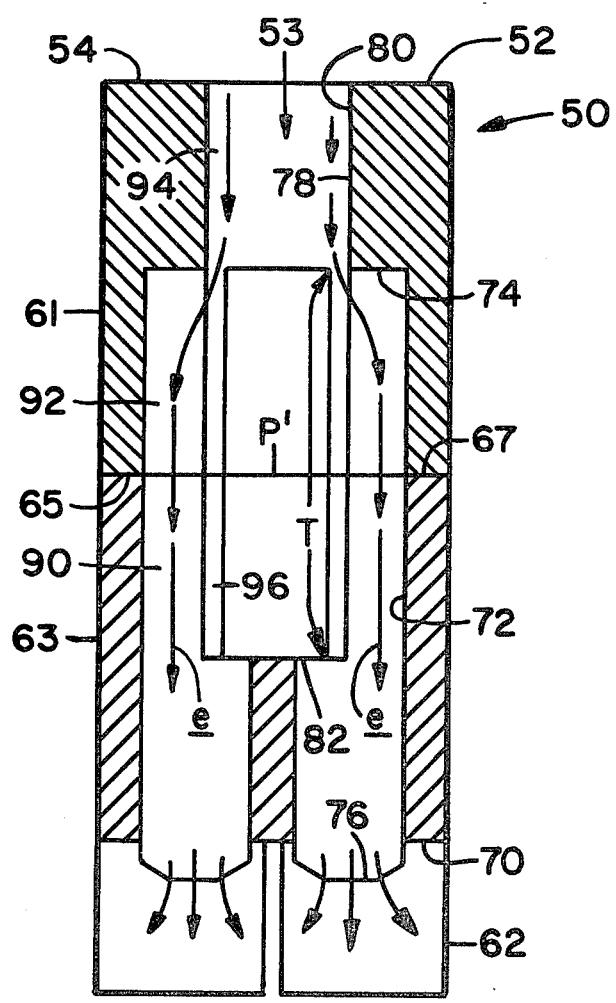
FIG. 7 is a side sectional view of the cell, taken along line 7—7 of FIG. 6.

In a preferred embodiment, either, or both, of the respective small and large feed holes 72 and 78 may be coterminus with, or extended beyond, the parting surface P', as long as the respective large and small feed holes 78 and 72 are in the aforementioned overlapping relationship (see FIGS. 2 and 7). Thus, the restrictions caused by the narrow gaps G of the prior art device are relieved.

In the prior art device, the extruded material squeezes through the narrow gap G. In the present invention, the extruded material moves axially through the large feed hole 78, and laterally into the transition zone T, and then moves axially through the smaller feed holes 72.

In a preferred embodiment, the transition zone T may be characterized as a space made up of a central cylindrical opening (large feed hole 78) and radially offset and axially overlapping cylindrical openings (small feed holes 72) located circumferentially thereabout. The transverse cross section of the transition zone T resembles a cloverleaf. The large feed hole 78 resembling a central portion thereof, and the small feed holes 72 resembling petals of the leaf.

Figure 5:
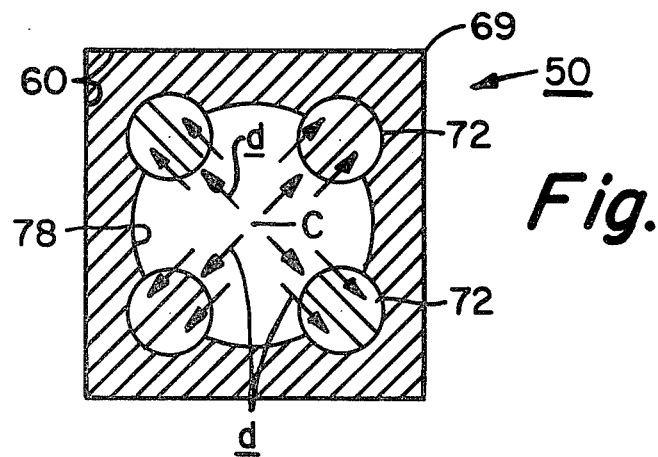
Figure 6:
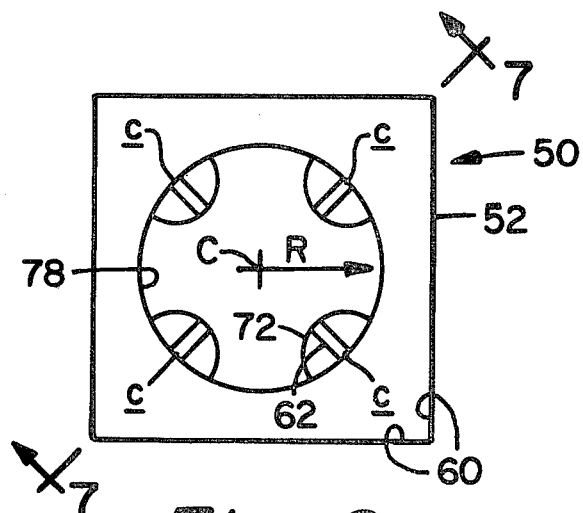
FIG. 6 is a top view of the cell shown in FIG. 2, taken along line 6—6 thereof.

Arrows d in FIG. 5 illustrate the lateral flow of extrusion material from the large feed hole 78 into the small feed holes 72.

In FIG. 7, the arrows e illustrate the smooth flow of the extrusion material from the inlet face 54 to the outlet face 56 via the transition zone T.

The die 50 of the present invention may be formed using conventional machining techniques including drilling, milling, electric discharge machining, chemical and electrochemical machining.

The small feed holes 72 and large feed holes 78 may be made by drilling. Preferably, they are made in two steps. See FIG. 7. A main portion 90 of each small feed hole 72 may be formed in the face plate 63 from the face 67. The small feed hole 72 may be completed by drilling an extension portion 92 in the body plate 61 from the face 65 thereof. The respective main and extension portions 90 and 92 of the small feed holes 72 are axially aligned. Likewise, a main portion 94 of the large feed hole 78 may be formed in the body plate 61, preferably from the face 65. An extension portion 96 of the large feed hole 78 may be formed in the face plate 63 from face 67 thereof. Thus, the two sets of holes are completed. By drilling all the holes from the faces 65 and 67, axial alignment of the respective holes and extension portions is assured.

Although the extension portions 92 of the small feed holes 72 have been shown terminating within the cell 52 at the inlet end 74 thereof, it is possible for said extension portions 92 to be extended all the way to the inlet face 54 of the die 50.

It has been discovered that die life can be improved by locating the small feed holes 72 in the web portions 66 of the slots 62 as hereinbefore described. In the prior art device, the small feed holes 22 feed the alternate intersections 18 of the slots 16. Because of this, the extrusion material, entering the slots at alternate intersections 18, tends to severely wear out the points 21 forming the corners of said alternate intersections 18.

Figure 3:
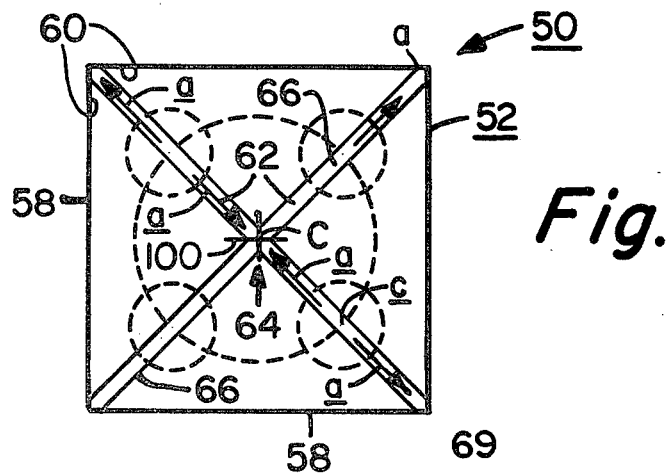
FIG. 3 is a bottom view of the cell shown in FIG. 2, taken along line 3—3 thereof.
Figure 4:
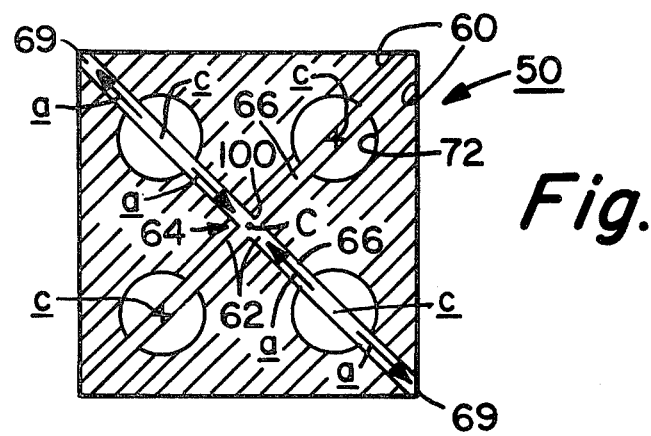
FIGS. 4 and 5 are cross sectional views of the cell, respectively taken along lines 4—4 and 5—5 of FIG. 2.

In FIGS. 3 and 4, arrows a illustrate an improvement of the present invention resulting from the placement of the small feed holes in the webs 66. When the extrusion material enters the slots 62 via the webs 66, it spreads towards the intersections 64 to form the structure of the honeycomb. Thus, points 100, forming corners of the intersections 64, do not receive direct attack by the extrusion material.

The webs 66 represent the highest area of impedance in the die 50. By feeding the slots 62 at the center of each web 66, the extrusion material exhibits improved lateral flow into the slots 62. Thus, the formation of the web portion of the honeycomb structure (not shown) is improved.

FIG. 8 shows a two dimensional view of a fragmented portion of a die 50 having an array of integral cells 52. The slots 62, small feed holes 72, and large feed holes 78 are superimposed on each other in solid lines without regard for drawing conventions with respect to hidden lines. The die 50 is an integral element made up of cells 52, demarcated by the broken lines to show margins 60. It should be understood that when a number of the cells 52 are machined into the die 50 as shown, the corners 69 of each of the cells 52 form marginal intersections 64' of the slots 62 with adjacent cells 52.

After the body plate 61 and face plate 63 have been machined, a brazing material is deposited on the opposed faces 65 and 67. The body plate 61 is then lined up in butting relationship with the face plate 63 along the opposed parting surface P'. Finally, the die is fired, thereby fusing the two pieces together.

In this connection, it should be understood that the laminated strength of the die 50 is substantially unaffected by the overlapping of the small feed holes 72 and large feed holes 78. The reason for this is that the opposed faces 65 and 67 are normally in contact only where the die 50 has not been drilled to form the respective small and large feed holes 72 and 78. Thus, extending the holes 72 and 78 does not remove any more contact area than has already been removed by the initial drilling. For example, in the prior art die 10, portions 36 of the body plate 12 mask the small feed holes 22. These portions 36 do not form part of the brazed parting surface P, and may thus be removed without affecting the laminated strength of the die 10. Also, portions 38 of the face plate 14 are not part of the parting surface P, and may likewise be removed.

In the present invention, extension of either, or both, of the small feed holes 72 and the large feed holes 78. removes material not originally part of the parting surface P'. Therefore, the laminated strength of the die 50 is substantially unaffected.

The overall strength of the die may be preferably improved by increasing the thickness of the body plate 61. Another way is to braze a supplementary plate 161 to the inlet face 54 of the body plate 61. See FIG. 11. The supplementary plate 161 may be similar to the body plate 61 except that it would have supplementary feed holes 178 formed therein. The supplementary feed holes 178 would be large enough to feed a plurality of the large feed holes 78 in a set. Also, the large feed holes 78 and supplementary feed holes 178 could be extended in axially overlapping relation to form a supplementary transition zone T'. As extrusion dies are made larger, multiple laminates will probably be required. The present invention is versatile to meet these increased demands.

Figure 11:
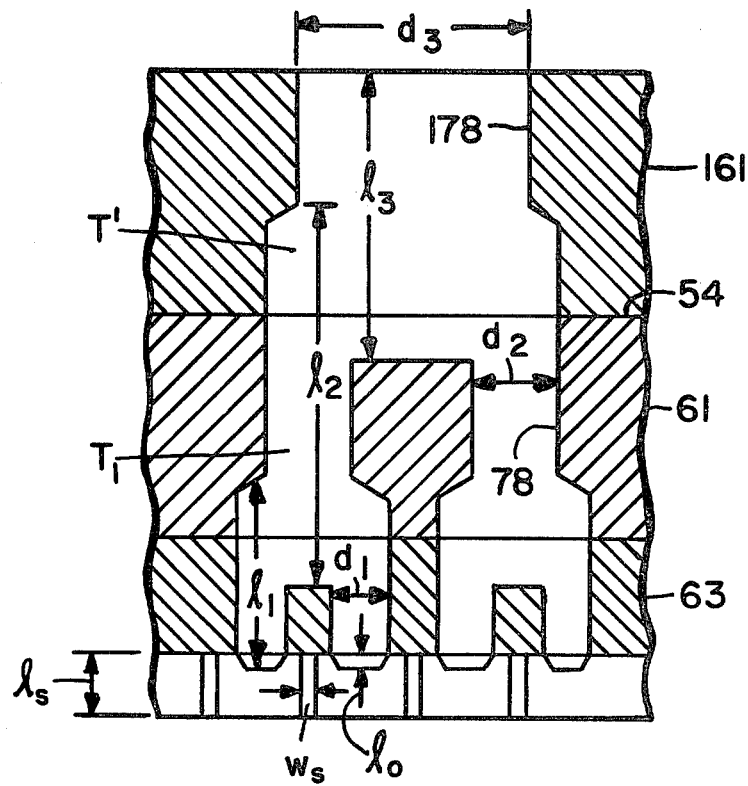
FIG. 11 is a side sectional elevation of an alternate embodiment of the present invention, showing a supplementary plate.

It has been found that there are general principles of die design that result in superior dies free of major defects. In the present invention, it has been found that the relative sizing of various components of the die 50 is important. In FIG. 11, certain portions of the drawing have dimensional notation as follows:

$l_s$ = slot depth
$w_s$ = slot width
$l_o$ = overlap of slot 62 and small feed hole 72
$l_1$ = small feed hole length
$d_1$ = small feed hole diameter
$l_2$ = large feed hole length
$d_2$ = large feed hole diameter
$l_3$ = supplementary feed hole length
$d_3$ = supplementary feed hole diameter The overlap of the small feed holes 72 and the large feed hole 78 forming the transition zone T may be expressed as a function of the size of the small feed hole. In a preferred embodiment, the transition zone T has a minimum length of about twice the diameter $d_1$ of small feed hole 72. Likewise the supplementary transition zone T' has a minimum length of $2d_2$. The overlap $l_o$ between the small feed holes 72 and the slots 62 should be not less than zero and preferably about 10% of the slot depth $l_s$. The small feed holes 72 should penetrate into the face plate 63 about $2d_1$ from the opposing face 67. The slot depth $l_s$ should be at least $10w_s$, or ten times the width of the slot 72. Preferably the slot depth $l_s$ is about 15 to about 17 times $w_s$. The face plate 63 should have a thickness of about the sum of the small feed hole penetration $2d_1$ and the slot depth $l_s$ or 3/16 inches, whichever is greater. The 3/16 inch minimum is the apparent lower limit for machinability.

The body plate 61 along, or in combination with the supplementary body plate 161, should have an overall thickness so that the die 50 is sufficiently strong to withstand the extreme forces of extrusion. The die strength should be not less than the elastic limit of the die material. In a preferred embodiment, the body plate 61 is about 1.0–1.25 inches thick.

Other variations of the present invention are possible. For example, it is within the scope of the present invention that two small feed holes 72a could form a set in communication with a large feed hole 78a (see FIG. 9). A cell 52a having such arrangement would have a rectangular margin 60a. The large feed hole 78a should inscribe at least up to the centers c of the small feed holes 72a. Further, the large feed hole 78a need not be circular, but may be oval as shown. It should be understood that only so much of the die material should be removed as is necessary to form each of the respective large and small feed holes 78 and 72, the slots 62 and the transition zone T as hereinbefore described.

FIG. 10 shows a triangular cell 52b. Three small feed holes 72b form a set, and large feed hole 78b inscribes the centers c thereof.

There has been provided a compound extrusion die in which the restriction between large and small feed holes has been relieved. The relief, in the form of a transition zone is provided by extending either, or both, of the large and small feed holes so that they axially overlap.

What is claimed is:

1. An extrusion die for forming honeycomb structures comprising:

a body member having an inlet face and an outlet face axially spaced apart and generally parallel with each other;

a plurality of interconnected discharge slots axially formed in said body member and communicating with said outlet face;

a plurality of relatively large axially-extending feed holes formed in said body member and communicating with said inlet face;

a plurality of axially-extending relatively small feed holes formed in said body member communicating at one end in axially overlapping relation with portions of said discharge slots; each of said large feed holes communicating in axially overlapping relation with a plurality of said small feed holes at an opposite end of said small feed holes;

each of said plurality of small feed holes having a longitudinal axis radially offset from the longitudinal axis of the large feed hole with which it communicates;

each large feed hole having an inlet end at said inlet face and axially overlapping a radially offset set of small feed holes to thereby form an enlarged transition zone between said communicating large and small feed holes, and said respective large and small feed holes and said discharge slots forming a passageway through the die from the inlet face to the outlet face thereof.

2. An extrusion die as defined in claim 18 wherein the small feed holes are grouped in sets of at least two, and the large feed hole communicating with such set has a margin which inscribes the centers of the feed holes in the set.

3. An extrusion die as defined in claim 2 wherein each large feed hole has an oval profile.

4. An extrusion die as defined in claim 1 wherein axes of the respective large and small feed holes are substantially parallel, each of the small feed holes in each set being arranged radially equidistant from, and in uniform circumferential spacing about, the large feed hole with which each of said small feed holes communicate.

5. An extrusion die as defined in claim 1 wherein the body member comprises: a body plate and a face plate, the body plate including the inlet face of the die, and the face plate including the outlet face thereof, said face plate and body plate each having opposed axial faces, and being arranged as a joined together laminate along said opposed axial faces.

6. An extrusion die as defined in claim 5 wherein the large feed holes extend through the body plate and part way into the face plate from each of the opposed axial faces.

7. An extrusion die as defined in claim 5 wherein the small feed holes extend at least part way into each of the face plate and the body plate from the opposed axial faces.

8. An extrusion die as defined in claim 1 wherein the respective large and small feed holes terminate within the die, and the die is formed of at least two plates laminated together at opposed faces formed intermediate the respective interior terminations of the large and small feed holes.

9. An extrusion die as defined in claim 1 comprising: at least two plates laminated together at opposed faces intermediate the overlap of the large and small feed holes.

10. An extrusion die as defined in claim 1 wherein the respective large and small feed holes are sized circular openings having corresponding diameters and the transition zone has a length at least twice the diameter of the small feed hole.

11. An extrusion die as defined in claim 1 the large feed holes are grouped in sets and further including at least one plurality of supplementary feed holes, larger than the aforementioned large feed holes, said supplementary feed holes extending into the body in axially overlapping relation with radially offset large feed holes.

12. An extrusion die as defined in claim 1 wherein the slots have a selected width, and the small feed holes extend into the slot up to about 10% of said width.

13. An extrusion die as defined in claim 1 wherein each small feed hole has a selected diameter and extends into the face plate to a depth up to about twice its diameter.

14. An extrusion die as defined in claim 1 wherein the slots have a selected depth and width, and the depth of each slot is at least ten times the width.

15. An extrusion die as defined in claim 14 wherein the depth of each slot is about between 15 and 17 times the width.

16. An extrusion die as defined in claim 1 wherein the body member is formed of a face plate and at least one body plate, the face plate including the outlet face of the body and an opposed axial face, the small feed holes penetrate into the face plate a selected depth from said opposed face, and the slots extend into the face plate to a selected depth, and the face plate has a thickness of at least the larger of about 3/16 inches and the sum of the small feed hole penetration and the slot depth therein.

* * * * *

UNITED STATES PATENT AND TRADEMARK OFFICE
CERTIFICATE OF CORRECTION

PATENT NO. : 4,465,454

DATED : August 14, 1984

INVENTOR(S) : Francis R. Duerr and Leonard W. Pokallus

It is certified that error appears in the above-identified patent and that said Letters Patent is hereby corrected as shown below:

Column 3, line 23, "examples" should read --example--.

Column 7, line 29, "18" should read --1--.

Signed and Sealed this

Eighth Day of January 1985

[SEAL]

Attest:

GERALD J. MOSSINGHOFF

Attesting Officer

Commissioner of Patents and Trademarks